(12) United States Patent
Yamamoto et al.

(10) Patent No.: US 9,691,211 B2
(45) Date of Patent: Jun. 27, 2017

(54) IMAGE PROCESSING APPARATUS, IMAGE PROCESSING METHOD, AND PROGRAM

(71) Applicant: Seiko Epson Corporation, Tokyo (JP)

(72) Inventors: Takayuki Yamamoto, Suwa (JP); Morimichi Mizuno, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/790,516

(22) Filed: Jul. 2, 2015

(65) Prior Publication Data

US 2016/0005253 A1 Jan. 7, 2016

(30) Foreign Application Priority Data

Jul. 3, 2014 (JP) ................ 2014-137456
Jul. 3, 2014 (JP) ................ 2014-137457

(51) Int. Cl.
*G06K 9/00* (2006.01)
*G07D 7/12* (2016.01)
*G06K 9/20* (2006.01)
*G06T 5/00* (2006.01)
*G06T 5/40* (2006.01)
*G07D 7/20* (2016.01)
*G02B 27/10* (2006.01)

(52) U.S. Cl.
CPC .......... *G07D 7/122* (2013.01); *G06K 9/2018* (2013.01); *G06K 9/2027* (2013.01); *G06T 5/007* (2013.01); *G06T 5/40* (2013.01); *G07D 7/20* (2013.01); *G06T 2207/10008* (2013.01); *G06T 2207/20216* (2013.01)

(58) Field of Classification Search
USPC ............... 382/100, 103, 106, 108, 112–116, 382/135–140, 162, 168, 173, 181–194, 382/207, 219, 232, 254, 274, 276, 382/284–295, 305, 312, 321, 124; 359/626; 348/362
See application file for complete search history.

(56) References Cited

U.S. PATENT DOCUMENTS 9,087,376 B2 * 7/2015 Rodriguez ............... B41M 3/10
2007/0073104 A1 3/2007 Iketani et al.
(Continued)

FOREIGN PATENT DOCUMENTS

JP 2002-102147 A 4/2002
JP 2007-076198 A 3/2007
(Continued)

*Primary Examiner* — Seyed Azarian
(74) *Attorney, Agent, or Firm* — Harness, Dickey & Pierce, P.L.C.

(57) ABSTRACT

An image processing apparatus includes an image acquiring unit that reads the front surface of a medium irradiated with first light to acquire a first image, and reads the front surface of the medium irradiated with second light including ultraviolet rays to acquire a second image, by driving an image sensor, a first corrected-image generating unit that generates a first corrected image by decreasing brightness of the first image, a second corrected-image generating unit that generates a second corrected image by increasing contrast of the second image, and a synthetic image generating unit that generates a synthetic image by synthesizing the first corrected image and the second corrected image.

20 Claims, 7 Drawing Sheets

(56) References Cited

U.S. PATENT DOCUMENTS

| | | | | |
|---|---|---|---|---|
| 2009/0122412 | A1* | 5/2009 | Steenblik | B42D 25/29 359/626 |
| 2011/0243400 | A1* | 10/2011 | Mitome | G03G 21/046 382/124 |
| 2013/0034290 | A1* | 2/2013 | Lee | G07D 7/12 382/135 |
| 2013/0039562 | A1 | 2/2013 | Watanabe | |
| 2013/0077136 | A1 | 3/2013 | Motoyama | |
| 2014/0307157 | A1* | 10/2014 | Oshima | H04N 5/3532 348/362 |

FOREIGN PATENT DOCUMENTS

| | | |
|---|---|---|
| JP | 2013-070225 A | 4/2013 |
| WO | 2011135992 A1 | 11/2011 |

* cited by examiner

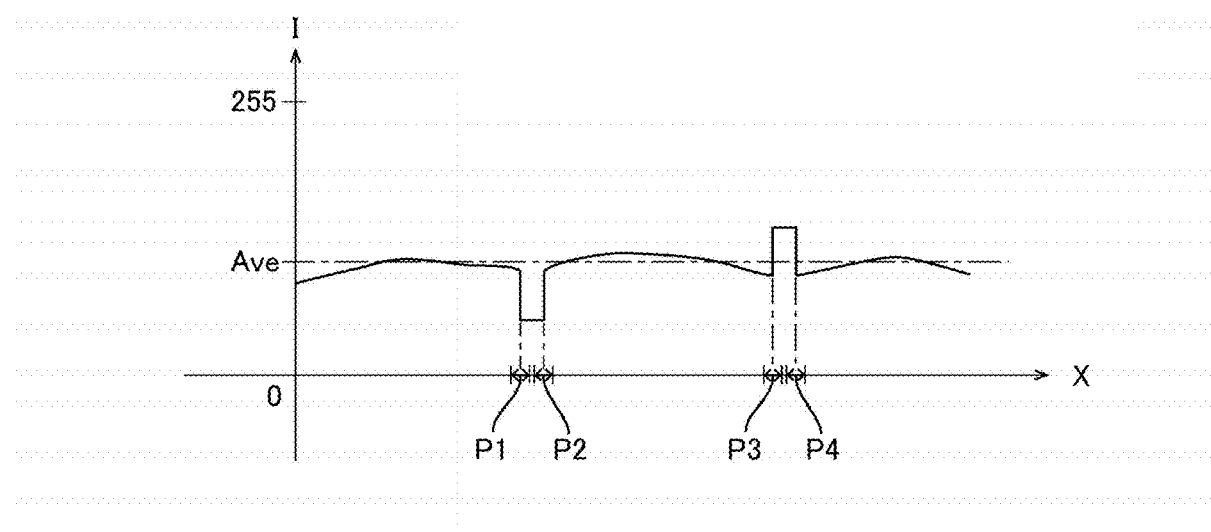

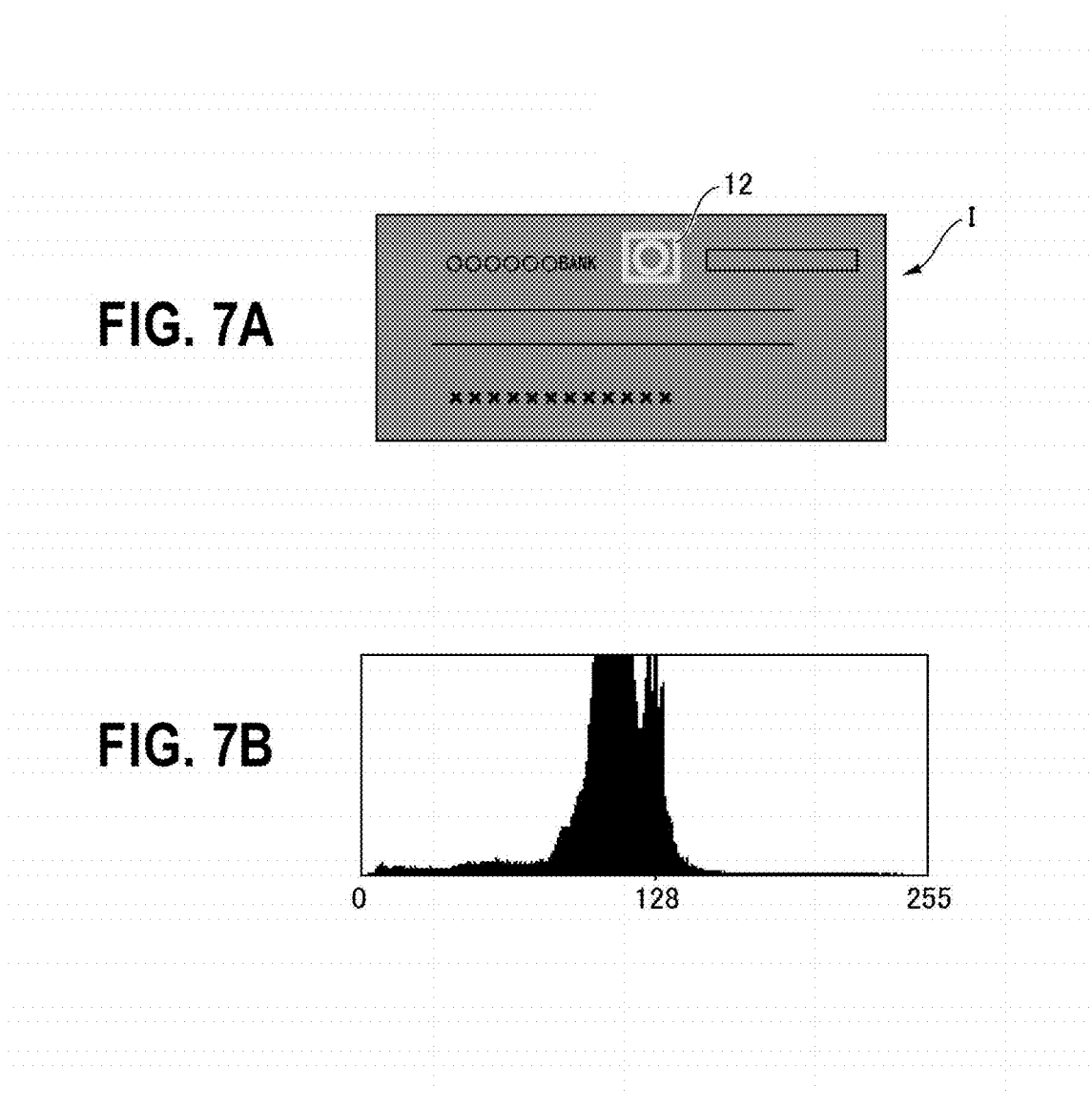

IMAGE PROCESSING APPARATUS, IMAGE PROCESSING METHOD, AND PROGRAM

The disclosures of Japanese Patent Application Nos. 2014-137456 filed on Jul. 3, 2014, and 2014-137457 filed on Jul. 3, 2014, each including specification, drawings and claims are incorporated herein by reference in its entirety.

BACKGROUND

1. Technical Field

The present invention relates to an image processing apparatus, an image processing method, and a program for reading the front surfaces of media including portions printed with ink which produces fluorescence during irradiation with ultraviolet rays.

2. Related Art

In financial institutions, if a check is received, the check is put on a check processing apparatus, and magnetic ink characters printed on the check are magnetically read, whereby magnetic information is acquired. Then, based on the magnetic information, a clearing process is performed. Also, in financial institutions, in parallel with the reading of the magnetic ink characters, the front surface of the check irradiated with visible rays is read by the check processing apparatus, whereby an image of the front surface is acquired, and the image is kept as an evidence of the clearing. Further, in financial institutions, in a case of using a check on which there is a forgery prevention image printed with ink which produces fluorescence during irradiation with ultraviolet rays (hereinafter, referred to as UV ink), the front surface of the check irradiated with ultraviolet rays is read by a check processing apparatus, whereby an image of the front surface is acquired, and the acquired image is used to determine whether the check is genuine. Also, in financial institutions, the image of the front surface of the check irradiated with the ultraviolet rays is kept as an evidence of clearing.

A check processing apparatus usable in that check clearing process is disclosed in JP-A-2013-070225. The check processing apparatus disclosed in JP-A-2013-070225 includes a magnetic sensor for magnetically reading magnetic ink characters, and an image sensor for irradiating the front surface of a check with read light, thereby acquiring an image of the front surface. The image sensor emits visible rays and ultraviolet rays as read light. Also, according to JIS Z 8120, the lower limit of the wavelengths of electromagnetic waves corresponding to visible rays is about 360 nm to 400 nm, and rays with wavelengths shorter than those of visible rays are defined as ultraviolet rays.

The front surface of a check irradiated with ultraviolet rays is read by the image sensor, whereby an image is acquired. This image is acquired by capturing light (ultraviolet rays) reflected from the front surface of the check to the read light, and fluorescence produced by UV ink forming a forgery prevention image. Also, the acquired image is a gray scale image in which image portions acquired by capturing the light (ultraviolet rays) reflected from the front surface of the check to the read light are dark, and image portions acquired by capturing the fluorescence produced by the UV ink are bright.

Here, in a case where the concentration of UV ink forming a forgery prevention image is not sufficient, fluorescence weakens. As a result, image portions acquired by capturing the fluorescence become dark, and thus it may become difficult to verify the forgery prevention image based on an acquired image.

Also, in a case of keeping an image of the front surface of a check irradiated with visible rays and an image of the front surface of the check irradiated with ultraviolet rays as evidences of clearing based on the check, there is a problem in which the volume of data on images to be kept increases. Here, in order to suppress the volume of data on images to be kept as evidences of clearing, it can be considered to synthesize an image of the front surface of a check irradiated with visible rays and an image of the front surface of the check irradiated with ultraviolet rays into one image and keep the synthetic image.

However, in a case of simply synthesizing the two images of the front surface, some problems such as a problem in which it becomes difficult to recognize a forgery prevention image in the synthetic image occur.

An object of the present invention is to provide an image processing apparatus, an image processing method, and a program for synthesizing an image of the front surface of a medium irradiated with visible rays and an image of the front surface of the medium irradiated with ultraviolet rays such that it is easy to discriminate a portion printed with UV ink, in view of the above described points.

SUMMARY

First Application Example (1) According to an aspect of the invention, an image processing apparatus includes an image acquiring unit that reads the front surface of a medium irradiated with first light to acquire a first image, and reads the front surface of the medium irradiated with second light including ultraviolet rays to acquire a second image, by driving an image sensor, a first corrected-image generating unit that generates a first corrected image by decreasing brightness of the first image, a second corrected-image generating unit that generates a second corrected image by increasing contrast of the second image, and a synthetic image generating unit that generates a synthetic image by synthesizing the first corrected image and the second corrected image.

In the present invention, in a case of synthesizing the first image of the medium irradiated with the first light such as visible light and the second image of the medium irradiated with the second light including ultraviolet rays, the brightness (for example, luminance) of the first image is decreased, whereby the first corrected image is generated, and the contrast of the second image is increased, whereby the second corrected image is generated, and then the first corrected image and the second corrected image are synthesized. Here, a second image which can be acquired in a case of reading the front surface of a check irradiated with ultraviolet rays is a gray scale image in which portions acquired by capturing light reflected from the front surface of the check to the read light are dark (their luminance is low), and a portion acquired by capturing fluorescence produced by a portion printed with UV ink is bright (its luminance is high). Therefore, in a second corrected image acquired by increasing the contrast of the second image, it is easier to discriminate the portion printed with UV ink as compared to the second image. Also, by synthesizing the second corrected image with a first corrected image acquired by decreasing the luminance of the first image, it is possible to increase contrast between a portion of the second corrected image corresponding to the portion printed with UV ink and the first corrected image. Therefore, it is possible to synthesize an image of the front surface of a medium irradiated with visible rays and an image of the front surface of the medium irradiated with ultraviolet rays such that it is easy to discriminate a portion printed with UV ink.

Second Application Example (2) In the image processing apparatus of (1), the first corrected-image generating unit generates the first corrected image by decreasing luminance values of pixels of the first image by a predetermined ratio.

According to this configuration, generation of the first corrected image is easy.

Third Application Example (3) In the image processing apparatus of (1), the second corrected-image generating unit includes an edge area extracting unit that extracts, as an edge area, an area including an image portion in which a luminance value difference between neighboring pixels is larger than a predetermined luminance difference, from the second image, a correction function generating unit that classifies a plurality of pixels included in the edge area into a first pixel group and a second pixel group having luminance values smaller than those of the first pixel group, based on the luminance values, and generates a correction function to correct the luminance values of the pixels such that contrast between pixels included in the first pixel group and pixels included in the second pixel group increases, and a luminance-value corrected image generating unit that generates the second corrected image by correcting the luminance values of the pixels in the second image with the correction function.

According to this configuration, the edge area extracting unit extracts, as the edge area, an image portion including the portion printed with UV ink and a portion of the front surface of the medium unprinted with UV ink, from the image of the medium irradiated with the ultraviolet rays. Then, the correction function generating unit generates the correction function, such that contrast between a bright portion (the first pixel group) and a dark portion (the second pixel group) in the edge area increases. Thereafter, the luminance-value corrected image generating unit corrects the entire image based on the correction function, thereby generating the second corrected image. As a result, in the second corrected image, contrast between the portion printed with UV ink and the front surface of the medium unprinted with UV ink increases. Therefore, it is easy to discriminate the portion printed with UV ink.

Fourth Application Example (4) In the image processing apparatus of (3), the edge area extracting unit extracts, as the edge area, an area including an image portion in which a luminance value difference between a first pixel and a second pixel neighboring each other is larger than the predetermined luminance difference, and the larger of the luminance values of the first pixel and the second pixel is larger than an average of the luminance values of the pixels in the second image.

In an image which is acquired by the image acquiring unit, the luminance values of an image portion acquired by capturing fluorescence produced by UV ink are larger than the average of the luminance values of all pixels in the image even in a case where the concentration of the UV ink is not sufficient. Therefore, according to the above described configuration, as the edge area, an image portion including a portion printed with UV ink can be extracted.

Fifth Application Example (5) In the image processing apparatus of (3), the correction function generating unit classifies the plurality of pixels included in the edge area, into the first pixel group and the second pixel group, based on a histogram of the luminance values of the plurality of pixels included in the edge area.

In the present invention, in order to classify the plurality of pixels included in the edge area into two pixel groups, the correction function generating unit can classify the plurality of pixels included in the edge area, into the first pixel group and the second pixel group, based on a histogram of the luminance values of the plurality of pixels included in the edge area.

Sixth Application Example (6) In the image processing apparatus of (5), the correction function generating unit generates the correction function based on a first average luminance value which is an average of the luminance values of the pixels included in the first pixel group, a second average luminance value which is an average of the luminance values of the pixels included in the second pixel group, and a third average luminance value which is an average of the first average luminance value and the second average luminance value.

In the present invention, the correction function generating unit generates the correction function, such that contrast between the pixels included in the first pixel group and the pixels included in the second pixel group increases. To this end, the correction function generating unit can generate the correction function based on the first average luminance value which is the average of the luminance values of the pixels included in the first pixel group, the second average luminance value which is the average of the luminance values of the pixels included in the second pixel group, and the third average luminance value which is the average of the first average luminance value and the second average luminance value.

Seventh Application Example (7) In the image processing apparatus of (3), the luminance values of synthetic pixels of the synthetic image acquired by synthesizing pixels of the first corrected image and pixels of the second corrected image are equal to or larger than the luminance values of the pixels of the first corrected image and are equal to or larger than the luminance values of the pixels of the second corrected image.

According to this configuration, since the luminance of pixels of the synthetic image corresponding to the portion printed with UV ink does not decrease, it is easy to discriminate that printed portion.

Eighth Application Example (8) In the image processing apparatus of any one of (1) to (7), the first image includes an image based on visible light, and the second image includes an image based on fluorescence from UV ink.

According to this configuration, for example, it is possible to read the front surface of a check having a forgery prevention image printed with UV ink, and synthesize an image of the front surface of the check and the forgery prevention image, thereby generating a synthetic image.

Ninth Application Example (9) According to another aspect of the invention, an image processing method includes reading a front surface of a medium irradiated with first light to acquire a first image, and reading the front surface of the medium irradiated with second light including ultraviolet rays to acquire a second image, by driving an image sensor, decreasing brightness of the first image to generate a first corrected image, increasing contrast of the second image to generate a second corrected image, and synthesizing the first corrected image and the second corrected image to generate a synthetic image.

In the present invention, in a case of synthesizing the first image of the medium irradiated with the first light such as visible light and the second image of the medium irradiated with the second light including ultraviolet rays, the luminance of the first image is decreased, whereby the first corrected image is generated, and the contrast of the second image is increased, whereby the second corrected image is generated, and then the first corrected image and the second corrected image are synthesized. Here, in the second corrected image acquired by increasing the contrast of the second image, it is easier to discriminate a portion printed with UV ink as compared to the second image. Also, by synthesizing the second corrected image with the first corrected image acquired by decreasing the luminance of the first image, it is possible to increase contrast between a portion of the second corrected image corresponding to the portion printed with UV ink and the first corrected image. Therefore, it is possible to synthesize an image of the front surface of a medium irradiated with visible rays and an image of the front surface of the medium irradiated with ultraviolet rays such that it is easy to discriminate a portion printed with UV ink.

Tenth Application Example

(10) In the image processing method of (9), in the decreasing step, luminance values of pixels of the first image are decreased by a predetermined ratio to generate the first corrected image.

According to this configuration, generation of the first corrected image is easy.

Eleventh Application Example

(11) In the image processing method of (9), from the second image, an area including an image portion in which a luminance value difference between neighboring pixels is larger than a predetermined luminance difference is extracted as an edge area, a plurality of pixels included in the edge area is classified into a first pixel group and a second pixel group having luminance lower than that of the first pixel group, based on the luminance, and a correction function is generated to correct the luminance values of the pixels such that contrast between pixels included in the first pixel group and pixels included in the second pixel group increases, and the second corrected image is generated by correcting the luminance values of the pixels in the second image with the correction function.

In the present invention, in order to increase contrast between the portion printed with UV ink and the front surface of the medium unprinted with UV ink, the following process is possible. That is, from the second image, an area including an image portion in which a luminance value difference between neighboring pixels is larger than a predetermined luminance difference is extracted as the edge area. A plurality of pixels included in the edge area is classified into a first pixel group and a second pixel group having luminance lower than that of the first pixel group, based on the luminance, and a correction function is generated to correct the luminance values of the pixels such that contrast between pixels included in the first pixel group and pixels included in the second pixel group increases. The luminance values of the pixels in the second image are corrected by the correction function, whereby the second corrected image is generated.

Twelfth Application Example

(12) In the image processing method of (11), as the edge area, an area including an image portion in which a luminance value difference between a first pixel and a second pixel neighboring each other is larger than the luminance difference, and the larger of the luminance values of the first pixel and the second pixel is larger than the average of the luminance values of the pixels in the second image is extracted.

In the present invention, in order to extract, as the edge area, an image portion including a portion printed with UV ink, it is preferable to extract, as the edge area, an area including an image portion in which a luminance value difference between a first pixel and a second pixel neighboring each other is larger than the luminance difference, and the larger of the luminance values of the first pixel and the second pixel is larger than the average of the luminance values of the pixels in the second image.

Thirteenth Application Example

(13) In the image processing method of (11), the plurality of pixels included in the edge area is classified into the first pixel group and the second pixel group, based on a histogram of the luminance values of the plurality of pixels included in the edge area.

In the present invention, in order to classify the plurality of pixels included in the edge area into two pixel groups, it is possible to classify the plurality of pixels included in the edge area into the first pixel group and the second pixel group, based on a histogram of the luminance values of the plurality of pixels included in the edge area.

Fourteenth Application Example

(14) In the image processing method of (13), the correction function is generated based on a first average luminance value which is the average of the luminance values of the pixels included in the first pixel group, a second average luminance value which is the average of the luminance values of the pixels included in the second pixel group, and a third average luminance value which is the average of the first average luminance value and the second average luminance value.

In the present invention, in order to generate the correction function such that contrast between the pixels included in the first pixel group and the pixels included in the second pixel group increases, it is possible to generate the correction function based on the first average luminance value which is the average of the luminance values of the pixels included in the first pixel group, the second average luminance value which is the average of the luminance values of the pixels included in the second pixel group, and the third average luminance value which is the average of the first average luminance value and the second average luminance value.

Fifteenth Application Example

(15) In the image processing method of (11), the luminance values of synthetic pixels of the synthetic image acquired by synthesizing pixels of the first corrected image and pixels of the second corrected image are equal to or larger than the luminance values of the pixels of the first corrected image and are equal to or larger than the luminance values of the pixels of the second corrected image.

According to this configuration, since the luminance of pixels of the synthetic image corresponding to the portion printed with UV ink does not decrease, it is easy to discriminate that printed portion.

Sixteenth Application Example

(16) In the image processing method of any one of (9) to (15), the first image includes an image based on visible light, and the second image includes an image based on fluorescence from UV ink.

According to this configuration, for example, it is possible to read the front surface of a check having a forgery prevention image printed with UV ink, and synthesize an image of the front surface of the check and the forgery prevention image, thereby generating a synthetic image.

Seventeenth Application Example

(17) According to another aspect of the invention, a program which is executed in a control apparatus which controls an image sensor, makes the control apparatus function as an image acquiring unit that reads the front surface of a medium irradiated with first light to acquire a first image and reads the front surface of the medium irradiated with second light including ultraviolet rays to acquire a second image, by driving the image sensor, a first corrected-image generating unit that generates a first corrected image by decreasing luminance of the first image, a second corrected-image generating unit that generates a second corrected image by increasing contrast of the second image, and a synthetic image generating unit that generates a synthetic image by synthesizing the first corrected image and the second corrected image.

According to the present invention, in a case of synthesizing the first image of the medium irradiated with the first light such as visible light and the second image of the medium irradiated with the ultraviolet rays, the luminance of the first image is decreased, whereby the first corrected image is generated, and the contrast of the second image is increased, whereby the second corrected image is generated, and then the first corrected image and the second corrected image are synthesized. Here, in the second corrected image acquired by increasing the contrast of the second image, it is easier to discriminate a portion printed with UV ink as compared to the second image. Also, by synthesizing the second corrected image with the first corrected image acquired by decreasing the luminance of the first image, it is possible to increase contrast between a portion of the second corrected image corresponding to the portion printed with the UV ink and the first corrected image. Therefore, it is possible to synthesize an image of the front surface of a medium irradiated with visible rays and an image of the front surface of the medium irradiated with ultraviolet rays such that it is easy to discriminate a portion printed with UV ink.

Eighteenth Application Example

(18) In the program of (17), the program makes the second corrected-image generating unit function as an edge area extracting unit that extracts, as an edge area, an area including an image portion in which a luminance value difference between neighboring pixels is larger than a predetermined luminance difference, from the second image, a correction function generating unit that classifies a plurality of pixels included in the edge area into a first pixel group and a second pixel group having luminance values smaller than those of the first pixel group, based on the luminance values, and generates a correction function to correct the luminance values of the pixels such that contrast between pixels included in the first pixel group and pixels included in the second pixel group increases, and a luminance-value corrected image generating unit that generates the second corrected image by correcting the luminance values of the pixels in the second image with the correction function, thereby.

In the present invention, the edge area extracting unit extracts, as the edge area, an image portion including the portion printed with UV ink and a portion of the front surface of the medium unprinted with UV ink, from the second image of the medium irradiated with the ultraviolet rays. Then, the correction function generating unit generates the correction function, such that contrast between a bright portion (the first pixel group) and a dark portion (the second pixel group) in the edge area increases. Thereafter, the luminance-value corrected image generating unit corrects the entire image based on the correction function, thereby generating the second corrected image. As a result, in the second corrected image, contrast between the portion printed with UV ink and the front surface of the medium unprinted with UV ink increases. Therefore, it is easy to discriminate the portion printed with UV ink.

BRIEF DESCRIPTION OF THE DRAWINGS

FIG. 5 is a luminance value graph of an image portion of a front surface image of the check.

FIGS. 7A and 7B are views for explaining a synthetic image.

DESCRIPTION OF EXEMPLARY EMBODIMENTS

Hereinafter, with reference to drawings, a check processing apparatus will be described as an embodiment of an image processing apparatus according to the present invention.

Check Processing System

Figure 1A:
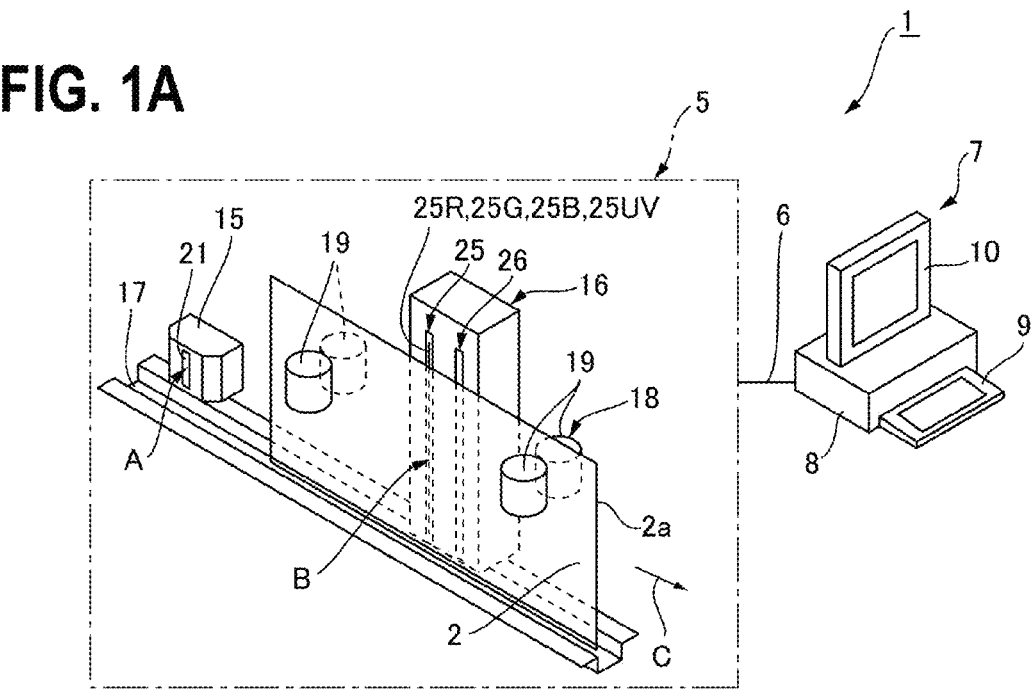
FIGS. 1A and 1B are explanatory views of a check processing system and a check according to the present invention, respectively.
Figure 1B:
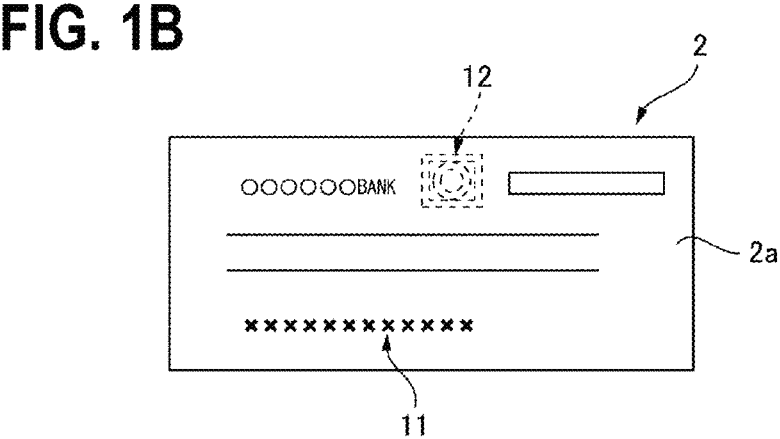

FIG. 1A is an explanatory view of a check processing system, and FIG. 1B is an explanatory view of a check. A check processing system (an image processing system) 1 is for performing some processes, such as a clearing process based on a check 2. As shown in FIG. 1A, the check processing system 1 includes a check processing apparatus 5, and a control apparatus (an image processing apparatus) 7 which is connected to the check processing apparatus 5 by a cable 6 or the like such that communication is possible. The control apparatus 7 includes a main apparatus body 8, and an input unit 9 and a display 10 which are connected to the main apparatus body 8. The main apparatus body 8 is a computer.

On the front surface 2a of a check 2 to be brought into financial institutions, magnetic ink characters 11 representing the account number or the like of a customer is printed with magnetic ink as shown in FIG. 1B. Also, on the front surface 2a of the check 2, a forgery prevention image 12 is printed with UV ink which produces fluorescence during irradiation with ultraviolet rays.

As shown in FIG. 1A, the check processing apparatus 5 includes a magnetic sensor 15, an image sensor 16, and a conveyance path 17 which extends through a magnetic read position "A" of the magnetic sensor 15 and an image read position "B" of the image sensor 16. Also, the check processing apparatus 5 includes a conveying mechanism 18, which conveys the check 2 along the conveyance path 17 such that the check passes the magnetic read position "A" and the image read position "B", if the check is inserted into the conveyance path 17. The conveying mechanism 18 includes pairs of conveying rollers 19 which forwards the check 2 while holding the check 2 therebetween if the check 2 is inserted into the conveyance path 17, and a conveyance motor 20 (see FIG. 2) which drives the pairs of conveying rollers 19.

The magnetic sensor 15 is disposed such that its magnetic read surface 21 faces the conveyance path 17. The magnetic sensor 15 reads the magnetic ink characters 11 from the check 2 passing the magnetic read position "A".

The image sensor 16 is a contact image sensor (CIS) module. The image sensor 16 irradiates the check 2 passing the image read position "B" with light, and reads light reflected from the check 2 or light produced by the check 2. The image sensor 16 is disposed such that an irradiating unit 25 and a reading unit (an imaging element) 26 face the conveyance path 17.

The irradiating unit 25 is provided linearly in a vertical direction perpendicular to the conveyance direction C of the check 2. The irradiating unit 25 includes, as light emitting elements, a plurality of red light emitting elements 25R for irradiation with red read light, a plurality of green light emitting elements 25G for irradiation with green read light, a plurality of blue light emitting elements 25B for irradiation with blue read light, and a plurality of ultraviolet light emitting elements 25UV for irradiation with ultraviolet read light which is composed of ultraviolet rays. The plurality of light emitting elements 25R, 25G, 25B, or 25UV for irradiation with one kind of read light is arranged linearly in a vertical direction.

The reading unit 26 is provided linearly in a vertical direction along the irradiating unit 25. The reading unit 26 is composed of an imaging element such as a CMOS sensor. The reading unit 26 (the imaging element) successively reads lines vertically extending on the check 2 passing the image read position "B", one line by one line, whenever the check 2 is irradiated with read light.

The check processing apparatus 5 conveys the check 2 along the conveyance path 17 by the conveying mechanism 18. Then, the check processing apparatus 5 reads the magnetic ink characters 11 from the check 2 passing the magnetic read position "A" by the magnetic sensor 15, thereby acquiring magnetic information. Then, the check processing apparatus 5 transmits the read magnetic information to the control apparatus 7. Further, the check processing apparatus 5 reads the front surface 2a of the check 2 from the check 2 passing the image read position "B" by the image sensor 16, thereby acquiring read information, and successively transmits the read information to the control apparatus 7.

The control apparatus 7 receives the magnetic information having been acquired by the check processing apparatus 5, and performs a clearing process based on the magnetic information and information input from the input unit 9.

Also, the control apparatus 7 acquires a first front surface image (a first image) and a second front surface image (a second image) based on the read information successively received from the check processing apparatus 5 (outputs from the image sensor 16). The first front surface image is a gray scale (composite gray) image acquired by irradiating the check 2 with read light composed of visible rays (red read light, blue read light, and green read light), and the second front surface image is an image acquired by irradiating the check 2 with read light composed of ultraviolet rays. The first front surface image and the second front surface image are composed of pixels according to the resolution of the image sensor 16.

Further, the control apparatus 7 corrects the first front surface image and the second front surface image acquired, and then synthesizes the first front surface image and the second front surface image, thereby generating a synthetic image. Then, the control apparatus 7 saves and keeps the synthetic image as an evidence of the clearing process.

Control System

Figure 2:
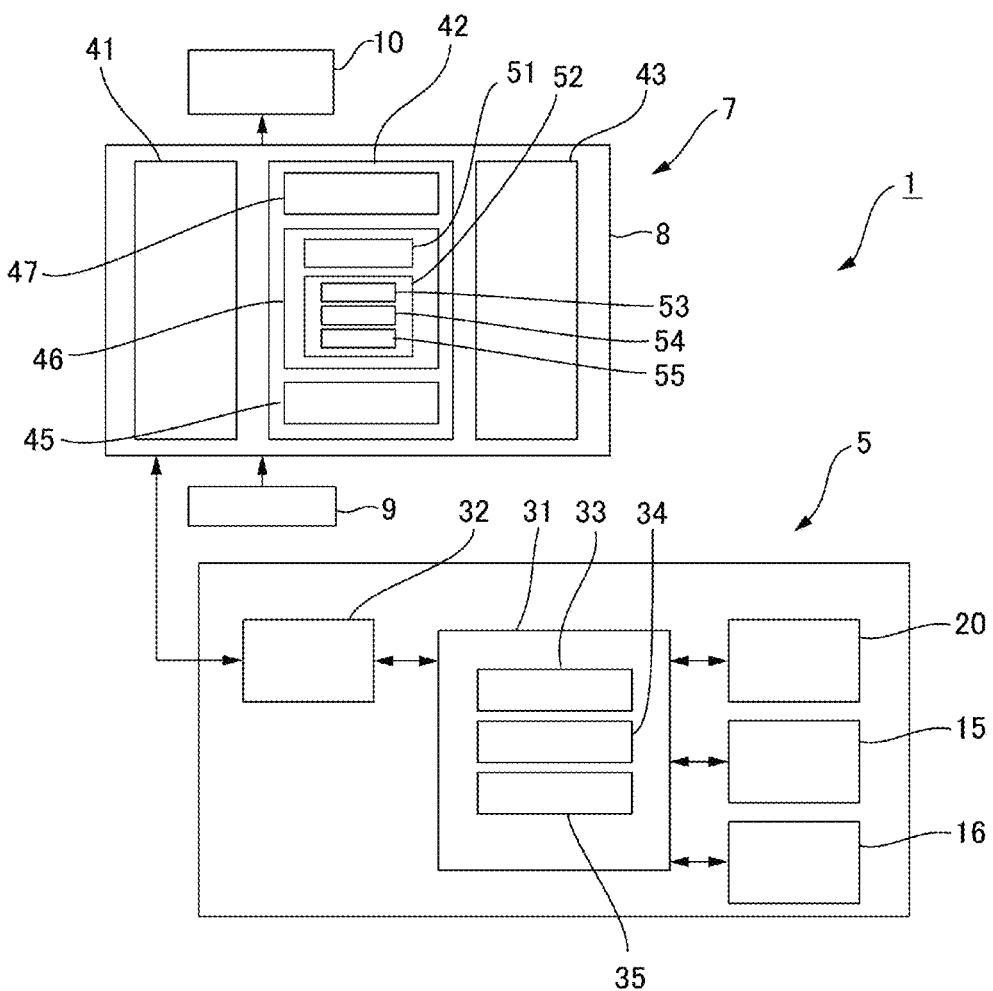
FIG. 2 is a block diagram illustrating a control system of the check processing system.

FIG. 2 is a block diagram schematically illustrating a control system of the check processing system 1. FIGS. 3A to 3D are views for explaining the first front surface image and a first corrected image. FIGS. 4A to 4D are views for explaining the second front surface image and a second corrected image.

As shown in FIG. 2, the control system of the check processing apparatus 5 mainly consists of a control unit 31 including a CPU and so on. The control unit 31 is connected to a communication unit 32 which includes a communication interface for performing communication with the control apparatus 7. Also, the control unit 31 is connected to the conveyance motor 20, the magnetic sensor 15, and the image sensor 16 through a driver (not shown).

In the control unit 31, a control program is executed. The control program makes the control unit 31 act as a conveyance control unit 33, a magnetic information acquiring unit 34, and an image reading unit 35. Therefore, the control unit 31 includes the conveyance control unit 33, the magnetic information acquiring unit 34, and the image reading unit 35.

The conveyance control unit 33 drives the conveyance motor 20 such that the check 2 is conveyed along the conveyance path 17.

The magnetic information acquiring unit 34 drives the magnetic sensor 15, whereby magnetic read information (a detection signal) is read from the magnetic ink characters 11 of the check 2 passing the magnetic read position "A". Also, the magnetic information acquiring unit 34 recognizes the magnetic ink characters 11 based on the magnetic read information. Recognition of the magnetic ink characters 11 is performed by collating the magnetic read information output from the magnetic sensor 15 with a signal waveform pattern of the magnetic ink characters 11 saved and kept in advance. The magnetic information acquiring unit 34 acquires the result of the recognition of the magnetic ink characters 11 as magnetic information. If magnetic information is acquired, the magnetic information acquiring unit 34 transmits that magnetic information to the control apparatus 7.

The image reading unit 35 drives the image sensor 16, whereby the front surface 2a of the check 2 is read from the check 2 passing the image read position "B".

In order to read the front surface 2a of the check 2 by the image sensor 16, the image reading unit 35 sequentially irradiates the front surface 2a of the check 2 with red read light, green read light, blue read light, and ultraviolet read light, in this order, by the irradiating unit 25 while the check 2 is conveyed at the image read position "B" by an conveyance amount of one line corresponding to a read resolution. Also, whenever the check 2 is conveyed by an conveyance amount of one line, the image reading unit 35 controls the reading unit 26 such that the image reading unit successively reads a front surface portion of the check 2 corresponding to one line and irradiated with red read light, a front surface portion of the check 2 corresponding to one line and irradiated with blue read light, a front surface portion of the check 2 corresponding to one line and irradiated with green read light, and a front surface portion of the check 2 corresponding to one line and irradiated with ultraviolet read light. Further, the image reading unit 35 successively transmits read information output from the reading unit 26 during irradiation with red read light, read information output from the reading unit 26 during irradiation with green read light, read information output from the reading unit 26 during irradiation with blue read light, and read information output from the reading unit 26 during irradiation with ultraviolet read light, to the control apparatus 7.

Also, as shown in FIG. 2, the control apparatus 7 includes a check processing apparatus control unit 41, an image processing unit 42, and a clearing process unit 43. The control apparatus 7 executes a program in the main apparatus body 8, thereby acting as the check processing apparatus control unit 41, the image processing unit 42, and the clearing process unit 43.

The check processing apparatus control unit 41 transmits a processing operation start command for starting a check processing operation, to the check processing apparatus 5.

The image processing unit 42 acquires a first front surface image G1 (see FIG. 3A) based on read information output from the reading unit 26 during irradiation with visible rays (red read light, green read light, and blue read light). Also, the image reading unit 35 acquires a second front surface image G2 (see FIG. 4A) based on read information output from the reading unit 26 during irradiation with ultraviolet read light. Further, the image processing unit 42 synthesizes the first front surface image G1 and the second front surface image G2, thereby generating a synthetic image "I" (see FIG. 7A).

The clearing process unit 43 performs a clearing process based on magnetic information such as an account number received from the check processing apparatus 5, and input information such as an amount of money input to the control apparatus 7 through the input unit 9. Also, the clearing process unit 43 displays the synthetic image "I" generated by the image processing unit 42, on the display 10. Further, the clearing process unit 43 saves and keeps the synthetic image "I" in association with clearance information including clearance date, the magnetic information, the input information, and so on.

Here, the image processing unit 42 includes an image acquiring unit 45, a corrected-image generating unit 46, and a synthetic image generating unit 47.

Figure 3A:
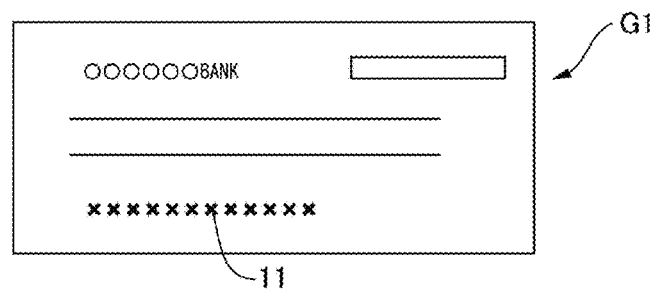
FIGS. 3A to 3D are views for explaining a first front surface image and a first corrected image of the check.
Figure 3B:

The image acquiring unit 45 acquires the first front surface image G1 based on the read information output from the reading unit 26 during irradiation with red read light, the read information output from the reading unit 26 during irradiation with green read light, and the read information output from the reading unit 26 during irradiation with blue read light. FIG. 3A shows the first front surface image G1 which is acquired by the image acquiring unit 45. FIG. 3B is a brightness (luminance value) distribution histogram of the first front surface image G1. Since the image is displayed on the display 10, brightness is represented by luminance values, and the horizontal axis of the histogram represents luminance values, and the vertical axis represents frequency (the number of pixels). Since the first front surface image G1 is a gray scale image as described above, luminance values representing luminance are represented by 256 gray levels, and a luminance value "0" is the darkest (black), and a luminance value "255" is the brightest (white).

Figure 4A:
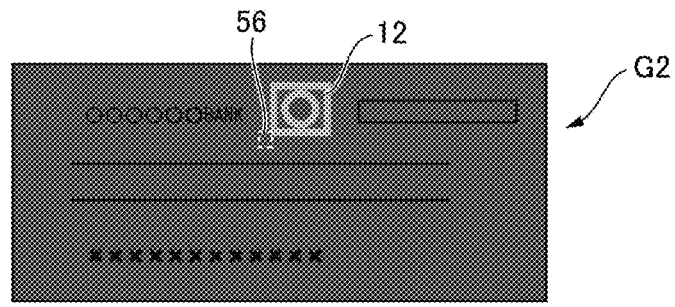
FIGS. 4A to 4D are views for explaining a second front surface image and a second corrected image of the check.
Figure 4B:
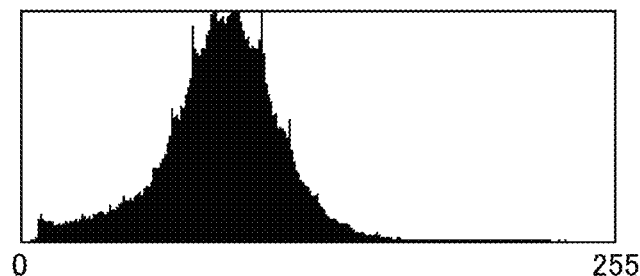

Also, the image acquiring unit 45 acquires the second front surface image G2 based on the read information output from the reading unit 26 during irradiation with ultraviolet read light. FIG. 4A shows the second front surface image G2 which is acquired by the image acquiring unit 45. FIG. 4B is a brightness (luminance value) distribution histogram of the second front surface image G2. In the second front surface image G2, a portion acquired by capturing light (ultraviolet rays) reflected from the front surface of the check 2 to the read light is dark (its luminance is low), and a portion acquired by capturing fluorescence produced by a portion printed with UV ink is light (its luminance is high).

The corrected-image generating unit 46 includes a first corrected-image generating unit 51 which corrects the first front surface image G1, and a second corrected-image generating unit 52 which corrects the second front surface image G2.

Figure 3C:
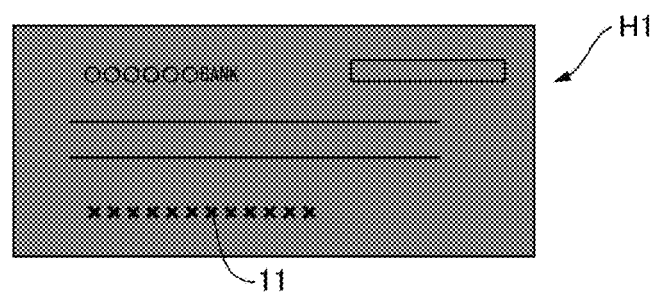
Figure 3D:
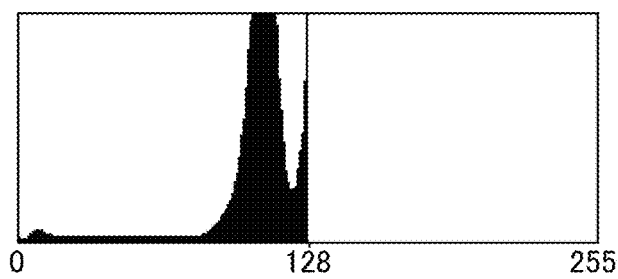

The first corrected-image generating unit 51 decreases the luminance value of each pixel of the first front surface image G1 at a predetermined ratio, thereby generating the first corrected image. In the present embodiment, the first corrected-image generating unit 51 decreases the luminance value of each pixel of the first corrected-image generating unit 51 by 50%. FIG. 3C shows a first corrected image H1 which is generated by the first corrected-image generating unit 51. FIG. 3D is a brightness (luminance value) distribution histogram of the first corrected image H1. As shown in FIGS. 3A to 3D, the first corrected image H1 is an image (with lower luminance) darker than the first front surface image G1.

The second corrected-image generating unit 52 includes an edge area extracting unit 53, a correction function generating unit 54, a luminance-value corrected image generating unit 55.

If the second front surface image G2 is acquired, the edge area extracting unit 53 extracts an image portion of the second front surface image G2 as an edge area 56 (to be described below). The edge area 56 is extracted with reference to the luminance values of individual pixels in the second front surface image G2. The edge area 56 is an area including an image portion in which a luminance value difference between a first pixel and a second pixel neighboring each other is larger than a predetermined luminance difference. Also, the edge area 56 is an area including an image portion in which the luminance value of a first pixel is larger than the luminance value of a second pixel, and is larger than the average Ave of the luminance values of all pixels of the second front surface image G2.

FIG. 5 is a graph illustrating the luminance of a portion of the second front surface image G2 corresponding to a pixel line of the forgery prevention image 12 arranged in the longitudinal direction of the check 2 (a direction corresponding to the conveyance direction C). The horizontal axis represents the positions of pixels, and the vertical axis represents the luminance values (0 to 255) of the pixels being at those positions. A luminance value "0" represents black, and a luminance value "255" represents white. In the example shown in FIG. 5, as image portions in which a luminance value difference between a first pixel and a second pixel neighboring each other is larger than the predetermined luminance difference, four image portions P1, P2, P3, and P4 exist. The image portion P1 or P2 is an image portion in which the luminance value of a first pixel with higher luminance is smaller than the average Ave of the luminance values of all pixels in the image. The image portion P3 or P4 is an image portion in which the luminance value of a first pixel with higher luminance is larger than the average Ave of the luminance values of all pixels in the image.

Here, luminance values in an image portion acquired by capturing fluorescence produced by UV ink are larger than the average Ave of the luminance values of all pixels in the image even in a case where the concentration of UV ink is not sufficient. Therefore, the image portions P3 and P4 including pixels having luminance values larger than the luminance value average Ave are image portions acquired by imaging portions printed with UV ink. Therefore, the edge area extracting unit 53 extracts the image portion P3 or image portion P4 as the edge area 56. The extracted edge area 56 is, for example, an area shown in FIG. 4A. Also, the image portions P1 and P2 correspond to front surface portions of the check 2 having patterns or printed with general ink.

Figure 6A:
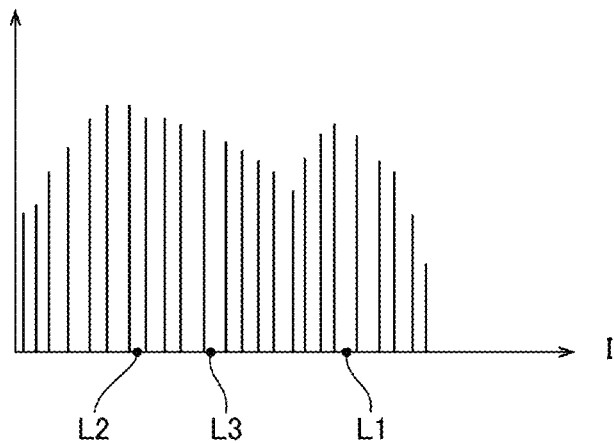
FIGS. 6A and 6B are a histogram of luminance values in an edge area and an explanatory view of a correction function, respectively.
Figure 6B:
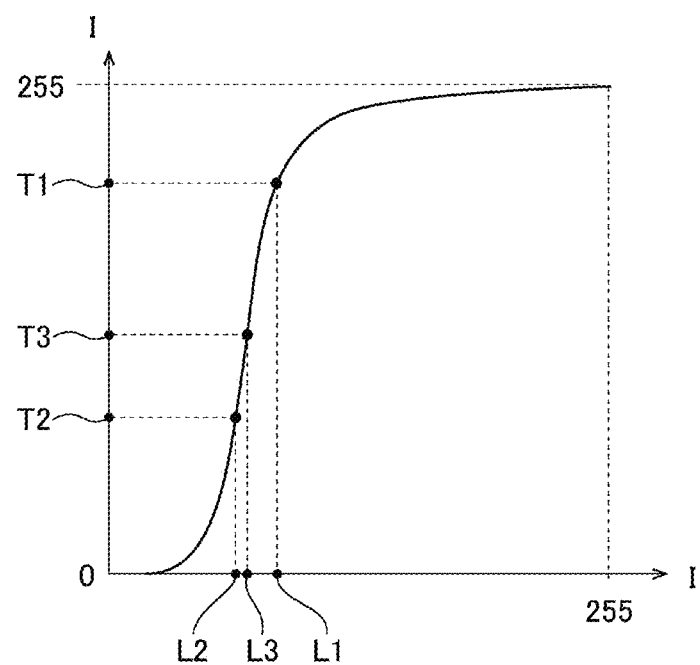

The correction function generating unit 54 classifies a plurality of pixels included in the edge area 56 into a first pixel group and a second pixel group, based on their luminance values. FIG. 6A is an example of a brightness (luminance value) distribution histogram of the plurality of pixels included in the edge area 56. FIG. 6B is a correction function graph.

The histogram representing the brightness (luminance value) distribution of the plurality of pixels included in the edge area 56 shows double-humped distribution with two humps at a high luminance portion and a low luminance portion as shown in FIG. 6A. Therefore, the correction function generating unit 54 uses an algorithm for finding a threshold value to divide a plurality of values having double-humped distribution into two portions, to classify the plurality of pixels of the edge area into the first pixel group and a second pixel group having luminance values smaller than those in the first pixel group. As the algorithm for finding a threshold value to divide a plurality of values having double-humped distribution, Otsu's method and the like are known.

Also, the correction function generating unit 54 generates a correction function to correct the luminance value of each pixel such that contrast between pixels included in the first pixel group and pixels included in the second pixel group increases. The correction function generating unit 54 generates the correction function based on a first average luminance value L1 which is the average of the luminance values of the pixels included in the first pixel group, a second average luminance value L2 which is the average of the luminance values of the pixels included in the second pixel group, and a third average luminance value L3 which is the average of the first average luminance value L1 and the second average luminance value L2.

Here, the generated configuration is for correcting the luminance values of pixels having the first average luminance value L1 to a first target luminance value T1, and correcting the luminance values of pixels having the second average luminance value L2 to a second target luminance value T2, and correcting the luminance values of pixels having the third average luminance value L3 to a third target luminance value T3. The first target luminance value T1 is larger than the second target luminance value T2 and the third target luminance value T3, and is smaller than the maximum value (in the present embodiment, "255") of the luminance values. The second target luminance value T2 is smaller than the third target luminance value T3, and is larger than the minimum value (in the present embodiment, "0") of the luminance values.

Also, the correction function is for correcting the luminance value of each pixel, such that a first difference between the first target luminance value T1 and the first average luminance value L1 becomes larger than a second difference between the second target luminance value T2 and the second average luminance value L2 and a third difference between the third target luminance value T3 and the third average luminance value L3, and the second difference becomes smaller than the third difference. In the present embodiment, the first average luminance value L1 is 54.02, and the first target luminance value T1 is 200. The first difference is 145.98. The second average luminance value L2 is 41.64, and the second target luminance value T2 is 63. The second difference is 21.36. The third average luminance value L3 is 47.83, and the third target luminance value T3 is 127. The second difference is 97.17.

FIG. 6B shows an example of the correction function which is generated by the correction function generating unit 54. In FIG. 6B, the horizontal axis represents the luminance values (input luminance values) of the pixels before correction, and the vertical axis represents the luminance values (corrected luminance values) of the pixels after correction. In the present embodiment, the correction function is represented by a Bezier curve, a sigmoid curve, or the like.

Also, the reason why the first target luminance value T1 is set to be smaller than the maximum value (in the present embodiment, "255") of the luminance values is for preventing or suppressing the luminance of the second corrected image acquiring by correcting the second front surface image G2 by the correction function from being saturated at the maximum value. Here, the second target luminance value T2 can be set to a value lower than the second average luminance value L2, and be used to generate the correction function.

Figure 4C:
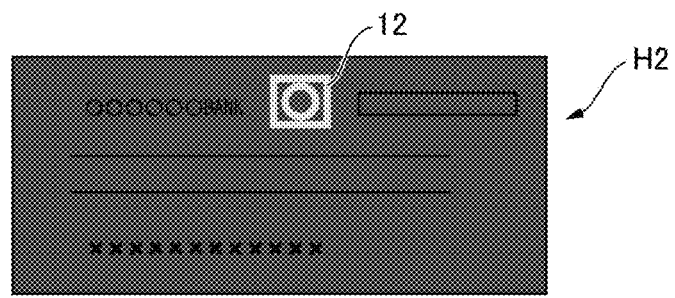
Figure 4D:
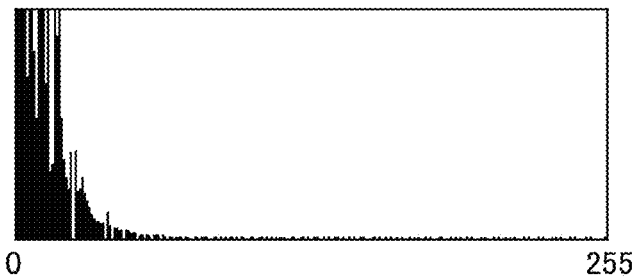

The luminance-value corrected image generating unit 55 corrects the luminance value of each of every pixel in the second front surface image G2 by the correction function, thereby generating a second corrected image H2. FIG. 4C shows the second corrected image H2. FIG. 4D is a brightness (luminance value) distribution histogram of the second corrected image H2. The second corrected image H2 shown in FIG. 4C has contrast higher than that of the second front surface image G2 shown in FIG. 4A.

The synthetic image generating unit 47 synthesizes the first corrected image H1 and the second corrected image H2, thereby generating a synthetic image "I". FIG. 7A is a view for explaining the synthetic image "I" which is generated by the synthetic image generating unit 47, and FIG. 7b is a brightness (luminance value) distribution histogram of the synthetic image "I".

The synthetic image generating unit 47 synthesizes mutually corresponding pixels of the first corrected image H1 and the second corrected image H2. The synthetic image generating unit 47 synthesizes the first corrected image H1 and the second corrected image H2, such that in the synthetic image "I", the synthetic pixels of the pixels of the first corrected image H1 and the pixels of the second corrected image H2 have luminance values equal to or larger than the luminance values of the pixels of the first corrected image H1 and equal to or larger than the luminance values of the pixels of the second corrected image H2.

In the present embodiment, the pixels of the first corrected image H1 and the pixels of the second corrected image H2 are synthesized based on the following Expression 1. In Expression 1, "Im" represents the luminance of a synthetic pixel, and "I1" represents a pixel of the first corrected image H1, and "I2" represents a pixel of the second corrected image H2.

$$Im=255\times(1-(1-I1/255)\times(1-I2/255)) \quad (1)$$

The synthesizing method based on Expression 1 is to perform positive-negative reversal on the first corrected image H1 while performing positive-negative reversal on the second corrected image H2, and overlap the pixels of the reversed first corrected image H1 and the pixels of the reversed second corrected image H2, and perform positive-negative reversal on the overlapped images, thereby generating the synthetic image "I".

FIG. 7A shows the synthetic image "I" generated by the synthetic image generating unit 47. The synthetic image "I" is an image acquired by synthesizing the first corrected image H1 acquired by decreasing the luminance of the first front surface image G1 and the second corrected image H2 acquired by increasing the contrast of the second front surface image G2. Also, according to the synthesizing method which is used in the synthetic image generating unit 47, in the synthetic image "I", the luminance of the synthetic pixels of the pixels of the first corrected image H1 and the pixels of the second corrected image H2 does not decrease. As a result, in the synthetic image "I", the luminance of pixels corresponding to the forgery prevention image 12 does not decrease. Therefore, it is easy to discriminate the forgery prevention image 12.

Also, the synthetic image generating unit 47 may synthesize the pixels of the first corrected image H1 and the pixels of the second corrected image H2 based on the following Expression 2.

$$Im=\max(I1,I2) \quad (2)$$

The synthesizing method based on Expression 2 is to synthesize mutually corresponding pixels of the first corrected image H1 and the second corrected image H2 such that the luminance value of each synthetic pixel is set to the larger of the luminance values of two corresponding pixels, thereby generating the synthetic image "I".

Check Processing Operation

In a financial institution, if the check 2 is received, in order to perform a clearing process, the check 2 is inserted into the conveyance path 17 of the check processing apparatus 5, and a processing operation start command is transmitted from the control apparatus 7 to the check processing apparatus 5.

As a result, the check processing apparatus 5 conveys the check 2 along the conveyance path 17 while reading the magnetic ink characters 11 printed on the check 2 by the magnetic sensor 15, thereby acquiring magnetic information. Also, the check processing apparatus 5 transmits the acquired magnetic information to the control apparatus 7. Further, the check processing apparatus 5 reads the front surface 2a of the check 2 by the image sensor 16, and successively transmits the read information, If receiving the read information from the check processing apparatus 5, the control apparatus 7 acquires the first front surface image G1 (FIG. 3A) and the second front surface image G2 (FIG. 4A). Then, the control apparatus 7 corrects the luminance values of the first front surface image G1, thereby generating the first corrected image H1 (FIG. 3C). Also, the control apparatus 7 generates the correction function based on the second front surface image G2, and corrects the second front surface image G2 by the correction function, thereby generating the second corrected image H2 (FIG. 4C). Thereafter, the control apparatus 7 synthesizes the first corrected image H1 and the second corrected image H2, thereby generating the synthetic image "I" (FIG. 7A), and displays the synthetic image "I" on the display 10.

Here, an operator checks whether the check 2 is genuine, based on the synthetic image "I" displayed on the display 10. That is, the operator verifies checks the forgery prevention image 12 shown in the synthetic image "I", on the display 10. Also, the operator checks information on the front surface or the like based on the synthetic image "I" and the check 2, and inputs information necessary for clearing to the main apparatus body 8 through the input unit 9. If information necessary for clearing is input, a clearing process is performed based on the input information and the magnetic information. If clearing is completed, the control apparatus 7 saves and keeps the synthetic image "I" in association with clearance information including clearance date, the magnetic information, the input information, and the like.

According to the present embodiment, as evidences of clearing based on the check 2, the first front surface image G1 of the check 2 irradiated with visible rays and the second front surface image G2 of the check 2 irradiated with ultraviolet rays are not individually kept, but the synthetic image "I" of the first front surface image G1 and the second front surface image G2 is kept. Therefore, it is possible to suppress the volume of data on images to be kept as evidences of clearing.

Also, in the present embodiment, since the luminance of pixels in the synthetic image "I" corresponding to the portion printed with UV ink is not lower than that in the second corrected image H2 before synthesization, it is easy to discriminate the forgery prevention image 12 in the synthetic image "I".

Further, in the present embodiment, in order to generate the first corrected image H1, the luminance value of each pixel of the first front surface image G1 is decreased at a constant ratio. Therefore, generation of the first corrected image H1 is easy. Also, in the present embodiment, the luminance value of each pixel of the first front surface image G1 is decreased at a constant ratio, whereby the brightness (luminance value) distribution histogram is compressed, and the upper limit value of the luminance of the first corrected image H1 is decreased as shown in FIG. 3D. Therefore, in the brightness (luminance value) distribution histogram of the synthetic image "I", portions exceeding the upper limit value of the luminance of the first corrected image H1 can be determined as portions which do not including information relative to the first corrected image H1. That is, in the present embodiment, since the luminance value of each pixel of the first front surface image G1 is uniformly decreased by 50%, and then the first front surface image G1 and the second corrected image H2 are synthesized, pixels with luminance values equal to or larger than 128 in the synthetic image "I" can be information added to the first corrected image H1 due to synthesization of the first corrected image H1 and the second corrected image H2, and can be determined as portions which do not include information on the first corrected image H1.

First Modification

Also, the control apparatus 7 may display the first front surface image G1 and the second corrected image H2 on the display 10. In this case, the operator can check whether the check 2 is genuine, based on the second corrected image H2 displayed on the display 10. That is, the following process is possible. First, the operator verifies the forgery prevention image 12 shown in the second corrected image H2, on the display 10. The operator checks information on the front surface or the like based on the first front surface image G1 and the check 2, and inputs information necessary for clearing, such as an amount of money and date, to the main apparatus body 8 through the input unit 9. If information necessary for clearing is input, the control apparatus 7 performs a clearing process based on the input information and the magnetic information.

Second Modification

In the above described embodiment, as the image processing apparatus, the check processing apparatus for processing checks has been exemplified. However, the present invention can also be applied to image processing apparatuses for processing images read from media printed with UV ink, other than checks. Also, in the above described embodiment, the first corrected image H1 and the second corrected image H2 are synthesized in an RGB color space. However, the values of the pixels of the first corrected image H1 and the values of the pixels of the second corrected image H2 may be converted into values in an HSB color space, and a synthetic image of the first corrected image H1 and the second corrected image H2 may be generated in the HSB color space.

Third Modification

Also, in the check processing system 1, the image acquiring unit 45, the corrected-image generating unit 46, and the synthetic image generating unit 47 may be included in the check processing apparatus 5, not in the control apparatus 7. In this case, the synthetic image generating unit 47 included in the check processing apparatus 5 transmits the synthetic image "I" to the control apparatus 7. Also, in this case, the image processing program is executed on the control unit (a controller) 31 of the check processing apparatus 5, thereby making the control unit 31 act as the image acquiring unit 45, the corrected-image generating unit 46, and the synthetic image generating unit 47.

Other Modifications

Also, the check processing apparatus 5 may include a pair of image sensors 16 which is provided at the image read position "B" so as to face each other with the conveyance path 17 interposed therebetween, and acquire images of the front and rear surfaces of the check 2. Also, the check processing apparatus 5 can acquire a color front surface image as the first front surface image G1. Further, the check processing apparatus 5 may include an image recognizing unit which performs image recognition on the characters and the like on the front surface 2a of the check 2, based on the first front surface image G1. Furthermore, in the check processing system 1, the magnetic information acquiring unit 34 and the image acquiring unit 45 may be included in the control apparatus 7, not in the check processing apparatus 5. In this case, magnetic read information which is output from the magnetic sensor 15, and read information which is output from the reading unit 26 are transmitted from the check processing apparatus 5 to the control apparatus 7.

What is claimed is:

1. An image processing apparatus comprising:
 a processor configured with an image acquisition component that reads the front surface of a medium irradiated with first light to acquire a first image, and reads the front surface of the medium irradiated with second light including ultraviolet rays to acquire a second image, by driving an image sensor;
 a first corrected-image generator that generates a first corrected image in which brightness of all pixels is lower than a middle brightness from the first image;
 a second corrected-image generator that generates a second corrected image having a contrast larger than a given level at an edge area of the second image from the second image;
 and a synthetic image generator that generates a synthetic image by synthesizing the first corrected image and the second corrected image.

2. The image processing apparatus according to claim 1, wherein
 the first corrected-image generator generates the first corrected image by decreases luminance values of pixels of the first image by a predetermined ratio.

3. The image processing apparatus according to claim 1, wherein
 the second corrected-image generator includes:
 an edge area extracting unit that extracts, as the edge area, an area including an image portion in which a luminance value difference between neighboring pixels is larger than a predetermined luminance difference, from the second image;
 a correction function generator that classifies a plurality of pixels included in the edge area into a first pixel group and a second pixel group having luminance values smaller than those of the first pixel group, based on the luminance values, and generates a correction function to correct the luminance values of the pixels such that contrast between pixels included in the first pixel group and pixels included in the second pixel group increases; and
 a luminance-value corrected image generator that generates the second corrected image by correcting the luminance values of the pixels in the second image with the correction function.

4. The image processing apparatus according to claim 3, wherein
 the edge area extracting unit extracts, as the edge area, an area including an image portion in which a luminance value difference between a first pixel and a second pixel neighboring each other is larger than the predetermined luminance difference, and the larger of the luminance values of the first pixel and the second pixel is larger than an average of the luminance values of the pixels in the second image.

5. The image processing apparatus according to claim 3, wherein
 the correction function generator classifies the plurality of pixels included in the edge area, into the first pixel group and the second pixel group, based on a histogram of the luminance values of the plurality of pixels included in the edge area.

6. The image processing apparatus according to claim 5, wherein
 the correction function generator generates the correction function based on a first average luminance value which is an average of the luminance values of the pixels included in the first pixel group, a second average luminance value which is an average of the luminance values of the pixels included in the second pixel group, and a third average luminance value which is an average of the first average luminance value and the second average luminance value.

7. The image processing apparatus according to claim 3, wherein
the luminance values of synthetic pixels of the synthetic image acquired by synthesizing pixels of the first corrected image and pixels of the second corrected image are equal to or larger than the luminance values of the pixels of the first corrected image and are equal to or larger than the luminance values of the pixels of the second corrected image.

8. The image processing apparatus according to claim 1, wherein
the first image includes an image based on visible light, and the second image includes an image based on fluorescence from UV ink.

9. The image processing apparatus according to claim 1, wherein
the synthesizing by the synthetic image generator is a synthesizing with which a luminance of a synthetic pixel of the synthetic image is not lower than a luminance of a corresponding pixel of the first corrected image and a corresponding pixel of the second corrected image.

10. An image processing method comprising:
reading a front surface of a medium irradiated with first light to acquire a first image, and reading the front surface of the medium irradiated with second light including ultraviolet rays to acquire a second image, by driving an image sensor;
generating a first corrected image in which brightness of all pixels is lower than a middle brightness from the first image;
generating a second corrected image having a contrast larger than a given level at an edge area of the second image from the second image; and
synthesizing the first corrected image and the second corrected image to generate a synthetic image.

11. The image processing method according to claim 10, wherein
in the generating step of the first corrected image, luminance values of pixels of the first image are decreased by a predetermined ratio to generate the first corrected image.

12. The image processing method according to claim 10, wherein
from the second image, an area including an image portion in which a luminance value difference between neighboring pixels is larger than a predetermined luminance difference is extracted as the edge area,
a plurality of pixels included in the edge area is classified into a first pixel group and a second pixel group having luminance lower than that of the first pixel group, based on the luminance, and a correction function is generated to correct the luminance values of the pixels such that contrast between pixels included in the first pixel group and pixels included in the second pixel group increases, and
the second corrected image is generated by correcting the luminance values of the pixels in the second image with the correction function.

13. The image processing method according to claim 12, wherein
as the edge area, an area including an image portion in which a luminance value difference between a first pixel and a second pixel neighboring each other is larger than the luminance difference, and the larger of the luminance values of the first pixel and the second pixel is larger than the average of the luminance values of the pixels in the second image is extracted.

14. The image processing method according to claim 12, wherein
the plurality of pixels included in the edge area is classified into the first pixel group and the second pixel group, based on a histogram of the luminance values of the plurality of pixels included in the edge area.

15. The image processing method according to claim 12, wherein
the luminance values of synthetic pixels of the synthetic image acquired by synthesizing pixels of the first corrected image and pixels of the second corrected image are equal to or larger than the luminance values of the pixels of the first corrected image and are equal to or larger than the luminance values of the pixels of the second corrected image.

16. The image processing method according to claim 10, wherein
the first image includes an image based on visible light, and the second image includes an image based on fluorescence from UV ink.

17. The image processing method according to claim 10, wherein
the synthesizing of the first corrected image and the second corrected image is a synthesizing with which a luminance value of a synthetic pixel of the synthetic image is not lower than luminance values of a corresponding pixel of the first corrected image and a corresponding pixel of the second corrected image.

18. A non-transitory computer readable medium storing a program causing a computer to execute a process for image processing, the process comprising:
reading a front surface of a medium irradiated with first light to acquire a first image, and reading the front surface of the medium irradiated with second light including ultraviolet rays to acquire a second image, by driving an image sensor;
generating a first corrected image in which brightness of all pixels is lower than a middle brightness from the first image;
generating a second corrected image having a contrast larger than a given level at an edge area of the second image from the second image; and
synthesizing the first corrected image and the second corrected image to generate a synthetic image.

19. The non-transitory computer readable medium according to claim 18, wherein
from the second image, an area including an image portion in which a luminance value difference between neighboring pixels is larger than a predetermined luminance difference is extracted as the edge area,
a plurality of pixels included in the edge area is classified into a first pixel group and a second pixel group having luminance lower than that of the first pixel group, based on the luminance, and a correction function is generated to correct the luminance values of the pixels such that contrast between pixels included in the first pixel group and pixels included in the second pixel group increases, and the second corrected image is generated by correcting the luminance values of the pixels in the second image with the correction function.

20. The non-transitory computer readable medium according to claim 18, wherein the synthesizing of the first corrected image and the second corrected image is a synthesizing with which a luminance value of a synthetic pixel of the synthetic image is not lower than luminance values of a corresponding pixel of the first corrected image and a corresponding pixel of the second corrected image.

* * * * *